United States Patent [19]

Takada

[11] Patent Number: 4,881,757
[45] Date of Patent: Nov. 21, 1989

[54] DRIVE DEVICE FOR VEHICLE PASSIVE SAFETY BELT

[76] Inventor: Juichiro Takada, 12-1, Shinmachi 3-chome, Setagaya-ku, Tokyo, Japan

[21] Appl. No.: 305,296

[22] Filed: Feb. 1, 1989

[30] Foreign Application Priority Data

Feb. 3, 1988 [JP] Japan ................................. 63-21912

[51] Int. Cl.⁴ ............................................. B60R 21/10
[52] U.S. Cl. ..................................... 280/804; 280/808
[58] Field of Search ............... 280/801, 802, 803, 804, 280/808; 180/268, 286

[56] References Cited

U.S. PATENT DOCUMENTS

| 4,257,625 | 3/1981 | Takada | 280/804 |
| 4,655,477 | 4/1987 | Takada | 280/804 |
| 4,784,407 | 11/1988 | Verellen et al. | 280/808 X |

FOREIGN PATENT DOCUMENTS

| 2586633 | 3/1987 | France | 280/804 |
| 134352 | 6/1987 | Japan | 280/804 |

Primary Examiner—Charles A. Marmor
Assistant Examiner—Tamara L. Finlay
Attorney, Agent, or Firm—Brumbaugh, Graves, Donohue & Raymond

[57] ABSTRACT

A drive device for a vehicle passive safety belt system comprises a first rotatable drum, a flexible drive tape having one end affixed to the first drum and leading from the first drum along a constrained path to a belt guide that is movable along a guide rail in the vehicle, a second rotatable drum positioned adjacent the path of the drive tape and proximate to the first drum, a flexible driving band having one end affixed to the first drum and its other end affixed to the second drum, the driving band overlapping the drive tape and being arranged to wind onto the second drum while unwinding from the first drum conjointly with the drive tape and to keep the drive tape from slackening on the first roll upon unwinding, and a drive device for conjointly rotating the first and second drums in one direction to wind the driving band into the second drum and unwind the drive tape and the driving band from the first drum and in the opposite direction to wind the drive tape and driving band onto the first drum and unwind the driving band from the second drum. A spring coupled between the first drum and the drive device biases the first drum in said opposite direction relative to the drive device and yields to enable the first drum to rotate at a speed different from the drive device. A lost motion coupling between the second drum and the drive device and adapted to couple the drive device to the first drum upon rotation in said one direction permits free rotation of the second drum within a predetermined range relative to the drive device upon rotation in said opposite direction.

2 Claims, 3 Drawing Sheets

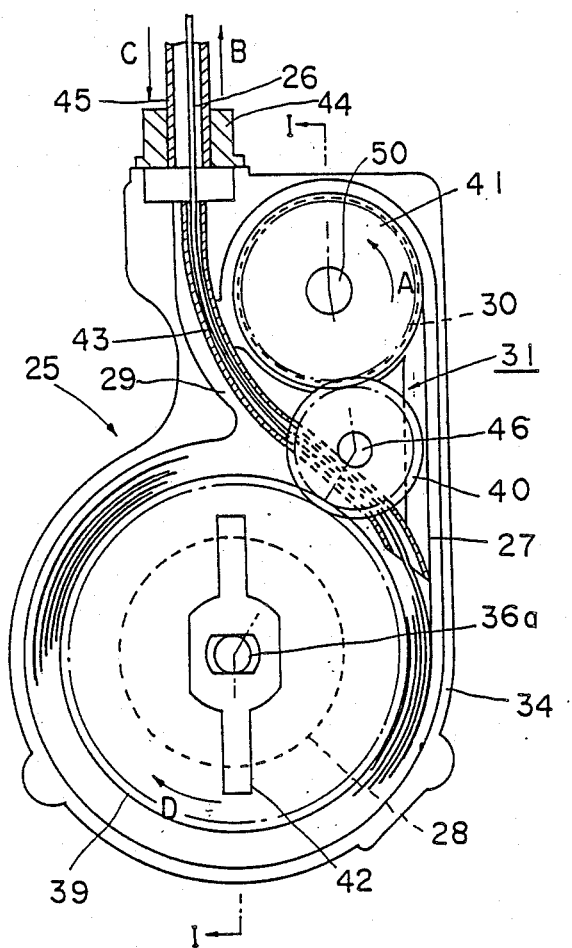
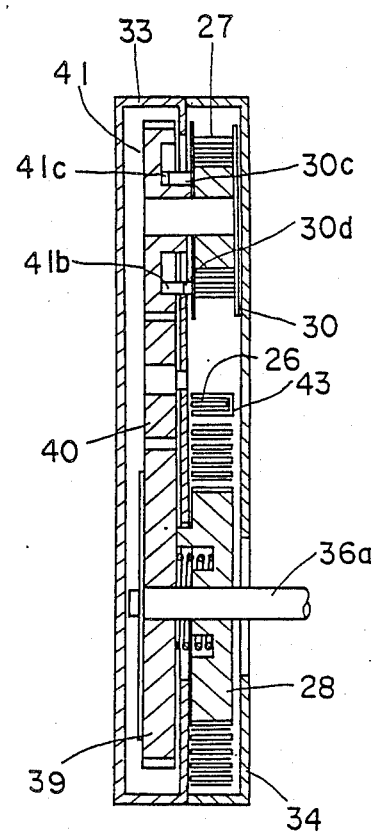
FIG. 4
FIG. 5

DRIVE DEVICE FOR VEHICLE PASSIVE SAFETY BELT

FIELD OF THE INVENTION

This invention concerns vehicle passive safety belt systems, particularly the drive devices for such systems, which automatically release or restrain the vehicle occupants in response to the opening and closing of the door.

BACKGROUND OF THE INVENTION

Many passive safety belt systems have been devised heretofore for ensuring the safety of the vehicle occupants. For example, in the passive belt system of FIG. 3 of the drawings, a shoulder belt 4 leads from a belt retractor 5 on the inboard side of the seat 3 of a vehicle 1 to an emergency release buckle 6 at the free end 7 of the belt. The buckle is connected to a tongue carried by a belt guide member 9 that moves along a guide rail 8 installed at the edge of the vehicle roof. A knee bar protects the occupant's lower body. As described below, the shoulder belt is moved automatically between the occupant restraint and release positions in response to opening and closing the vehicle door 2.

The inventor of the present invention previously proposed a passive safety belt system of such a type in Japanese Utility Model Publications Nos. 108668/1986 and 193849/1986. The device disclosed in the former publication, which is an improved type of the latter, is shown in FIGS. 1 and 2. In that drive device, the belt guide 9 (FIG. 3) is attached to the free end of a flexible drive tape 14. The other end of the drive tape 14 and one end of a driving band 16 are attached to a first drum 15 such that they may be wound and unwound in an overlapped state, each turn of the band 16 overlying the corresponding turn of the tape 14. A second drum 18 is located adjacent the path 17 along which the tape 14 leads from the first drum 15. The driving band 16 separates from the tape 14 and has its other end affixed to the second drum. An interlocking mechanism 19, such as gears, couples the shafts of the first and second drums 15 and 18 so that they rotate conjointly, and a driving mechanism 20 is connected to at least one of the shafts 21 and 22 of the first and second drums 15 and 18 and rotates the drum shafts 2 and 22 selectively in either direction. The shaft 22 of the second drum 18 is fixed to its gear and is thus driven directly at all times when the device is operating. The first drum 15 is rotatable on its shaft 21 but is coupled by springs 23 to the shaft 21 that bias it in the winding direction of the drum. The springs 23 allow the first drum to rotate at a slightly different speed than that of the shaft, thereby accommodating the difference between the rate of change in the thickness of the tape and band on the drum roll 15 and the rate of change in thickness of the band on the drum 18 as the tape and band wind and unwind from the respective drums. The springs 23 enable the tape and band to wind tightly onto the drum 15 by maintaining a bias in the winding direction.

In particular, even though the first and second drums 15 and 18 have a constant relative rotation ratio due to the interlocking mechanism, their actual diameters when winding or unwinding the flexible drive tape 14 and the driving band 16 increase or decrease according to the thickness of the wound tape or band. The change in the diameter of the first drum 15 as the tape and band wind and unwind in the overlapped state is larger than that of the second drum 18 as the band 16 alone winds and unwinds, and there is a chance of slack or looseness developing in the band 16 when it is wound onto the second drum 18. Such slack can cause buckling and breaking of the band. Also, the slack can allow the first drum to start rotating before the second drum at the start of rewinding, which can produce a high stress in the band when the slack has been taken up. The foregoing problems can reduce the service life of the band.

With a view to overcoming these problems, an object of this invention is to provide a belt drive device which does not allow any slack in the band when it is wound around the second drum.

SUMMARY OF THE INVENTION

In order to achieve the above-mentioned purpose, there is provided, according to the invention, a drive device for a vehicle passive safety belt in which the belt is moved automatically between a restraining configuration and a releasing configuration in response to opening and closing of the vehicle door. The device comprises a first rotatable drum, a flexible drive tape having one end affixed to the first drum and leading from the first drum along a constrained path to a belt guide that is movable along a guide rail in the vehicle, a second rotatable drum positioned adjacent the path of the drive tape and proximate to the first drum, and a flexible driving band having one end affixed to the dirst drum and its other end affixed to the second drum. The driving band overlaps the drive tape and is arranged to wind onto the second drum while unwinding from the first drum conjointly with the drive tape and to keep the drive tape from slackening on the first roll upon unwinding. A drive device conjointly rotates the first and second drums in one direction to wind the driving band onto the second drum and unwind the drive tape and the driving band from the first drum and in the opposite direction to wind the drive tape and driving band onto the first drum and unwind the driving band from the second drum. A spring coupled between the first drum and the drive device biases the first drum in said opposite direction relative to the drive device but yields to enable the first drum to rotate at a speed different from the drive device. A lost motion coupling between the second drum and the drive device couples the drive device to the first drum upon rotation in said one direction and permits free rotation of the second drum within a predetermined range relative to the drive device upon rotation in said opposite direction.

The above-described construction according to the present invention functions to make said second drum rotate freely during the unwinding of the driving band, that is when it and the drive tape are wound onto the first drum. Meanwhile, the first drum is directly driven in the winding direction against the opposing force of the drive tape which is then operating in tension as it pulls the belt guide along the guide rail. The free rotation of the second drum ensures that the winding of the tape and band onto the first drum is not influenced by any driving or retarding affect of the second drum at any stage in the winding; the second drum runs slightly faster than the drive as the thickness of the turns of tape and band increases on the first drum and the thickness of the turns of the band on the second drum decreases. On the other hand, when the drive operates to unwind the tape and band from the first drum, the lost motion coupling allows the drive to take up the lost motion before the second drum starts to rotate and unwind the tape and band. The spring between the first drum and the drive and the resistance of the tape to being pushed out to move the belt guide keeps the first drum from rotating with the drive during take-up of the lost motion, so both drums start to rotate at the same time.

For a better understanding of the invention, reference may be made to the following description of an embodiment of the invention, taken in conjunction with the figures of the accompanying drawings.

DESCRIPTION OF THE DRAWING

FIG. 4 is a side elevational view of the embodiment, the wall of the case being broken away to reveal the working components;

FIG. 5 is a cross-sectional view of the embodiment taken along a broken plane indicated by the lines I—I of FIG. 4;

DESCRIPTION OF THE EMBODIMENTS

Figure 1:
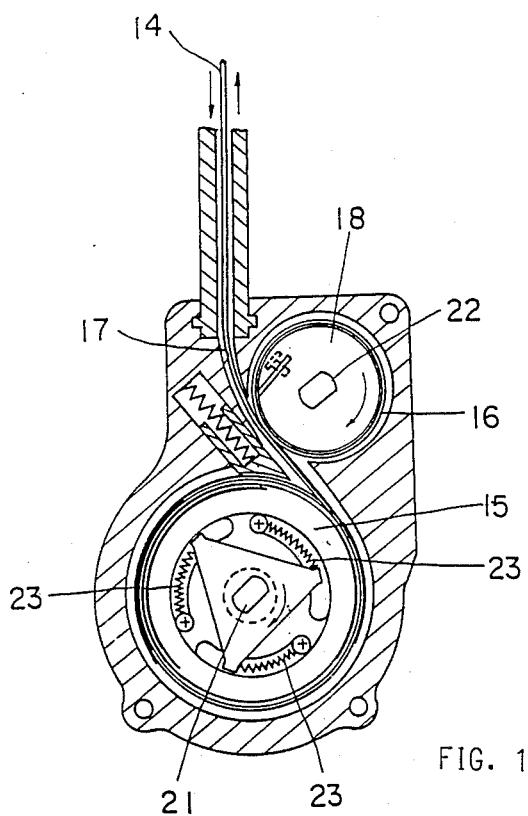
FIG. 1 is a side elevational view of the drums of a prior art drive device, the casing being broken away in cross section.
Figure 2:
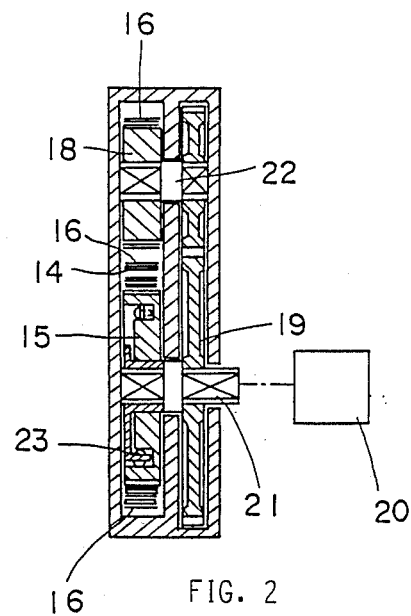
FIG. 2 is a cross-sectional view of the prior art device of FIG. 1 taken generally along a plane that includes the axes of the drums.

The embodiment (see FIGS. 4 to 6) comprises a first drum 28 to which is fastened one end of a flexible drive tape 26 and one end of a driving band 27, the band overlapping the drive tape 26. A second drum 30 is located adjacent the path 29 along which the drive tape 26 leads before it exits the drive device for its constrained run to its other end, which is fastened to the belt guide (see FIG. 3).

The other end of the driving band 27 is fastened to the second drum 30 for winding or unwinding onto or from its circumferential surface. A gear train 31 or its equivalent interlocks the first drum 28 with the second drum 30, and a driving mechanism 32 drives the first or the second drum 30.

Figure 6:
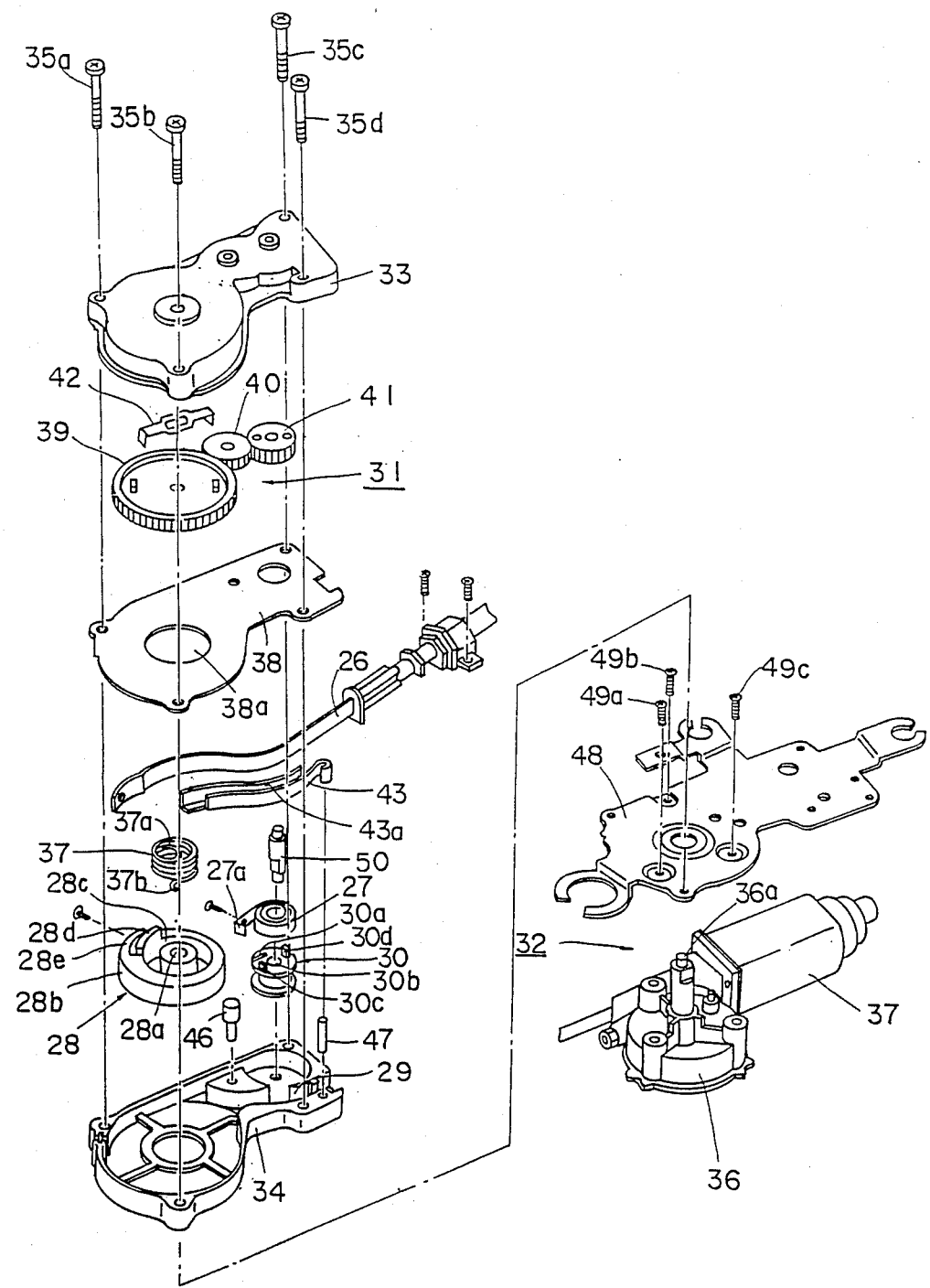
FIG. 6 is an exploded pictorial view of the embodiment.

With particular reference to FIG. 6, the first drum 28 is a nearly cylindrical member made of a polymeric material and has a shaft hole 28a in the center through which the drive shaft 36a of the driving mechanism 32 (described below) is rotatably inserted, a protrusion 28d, and a fitting part 28e on the outer circumference, said fitting part 28e being provided for fixing one end of the drive tape 26 and one end of the driving band 27 to the first drum. At one side of the first drum 28 is provided an annular recess 28c coaxial with the shaft hole 28a, where a torsion spring 37 is received. One end 37a of the spring 37 engages the gear 39 inserted into and fixed to said drive shaft 36a via the hole 38a in the partition 38, and the other end 37b thereof engages a notch (not shown) at the bottom of the recess 28c of the first drum 28. The spring biases the first drum 28 in the winding direction. Numeral 42 designates a strap that firmly secures the gear 39 to the draft shaft 36a. At the face of the gear 39 that is not visible in FIG. 6 is a protrusion (not shown) that is engageable with the protrusion 28d on the first drum 28.

The second drum 30 is a nearly cylindrical member having a shaft hole 30b in the center through which the shaft 50, of which one end is supported by the base 34, is rotatably inserted, a fitting portion 30a where the other end 27a of the driving band 27 is attached, and two protrusions 30c and 30d formed at diametrically opposite positions with respect to the shaft hole 30b. Onto the shaft 50 is rotatably installed the gear 41 associated with the second drum 30, to which gear 41 is transmitted the rotary force of the gear 39 via an idle gear 40 rotatably supported by a shaft 46. In this embodiment, the gears 39, 40 and 41 form an interlocking drive transmission mechanism 31 for drums 28 and 30. This interlocking mechanism 31 may also be formed by a combination of a timing pulley and a timing belt or by a sprocket and a chain instead of the gears 39, 40 and 41.

Figure 7:
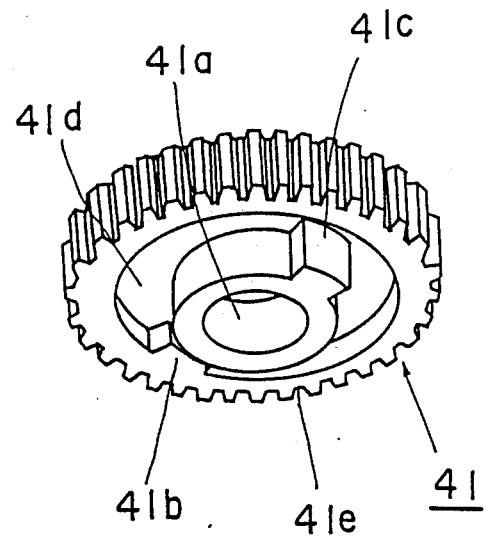
FIG. 7 is a pictorial view of an enlarged scale of the gear associated with the second drum.

The back of the gear 41, as shown in FIG. 7, has an annular recess 41d around the shaft hole 41a into which the shaft 50 is rotatably inserted, a protrusion 41b protruding from the circumferential flange portion 41e toward the hole 41a, and aprotrusion 41c protruding from the boss around the shaft hole 41a toward the outer circumference. The protrusions 30c and 30d on the second drum 30 are formed on the same circumference of a circle as said protrusions 41b and 41c. Therefore, when the gear 41 is turned at a certain angle, the protrusions 41b and 41c will contact the protrusions 30c and 30d on the second drum 30. These protrusions 30c, 30d, 41b and 41c form a lost motion coupling that permits the drum 30 to rotate freely relative to the gear 41 nearly 360°; the clearance between the ends of the protrusions 41b and 41c and the walls of the recess 41d opposite those ends allow the corresponding protrusions 30c and 30d that engage them, respectively, to rotate past the non-corresponding protrusions 41b and 41c. It is not essential to have two sets of protrusions— one set will suffice where strength requirements can be met.

If the interlocking drive transmission is based on a timing pulley, etc., a similar protrusion to that formed on the gear 41 may be provided at that surface of the timing pulley which faces the second drum.

Numeral 43 in FIG. 6 denotes a guide member which guides the drive tape 26 as it leads away from the first drum 28. This guide member 43 is of a gradual "S"-shape in external appearance and is of "U"-shaped cross section in order to provide a guideway 43a for the drive tape 26. The guide member 43 is mounted along the path 29 formed in the casing base 34 through which the drive tape 26 leads. Numeral 47 in the figure denotes a pin for supporting one end of the guide member 43 at the desired position.

The drive tape 26 is rectangular and of a flat, thin cross section and can be made of a hard polymeric material, such as nylon or polyurethane, of a metal or of a metal covered with a polymeric material.

The drive mechanism 32 comprises a motor 37 as the drive source, a worn gear fixed to the motor shaft (not shown) and a gear box 36 incorporating the worm wheel engaging with the worm gear (neither is shown). The drive shaft 36a is fixed at the center of said worm wheel and receives the rotational force from the motor 37 via the worm gear and worm wheel. The motor 37 and gear box 36 are made in one unit and fixed to the bottom surface of a mounting plate by which the drive device is mounted in the vehicle, such as by means of screws 49a through 49c. On the surface of the plate 48, further, are fixed the aforesaid base 34 and the cover 33 for encasement of the components incorporated in the base 34, which is fastened by means of screws 35a through 35d.

The functions and effects of the belt system and drive device having the above-described construction will hereinafter be described.

When the door 2 is opened with the belt guide 9 (shown in solid lines in FIG. 3) positioned at the passenger restraining position at the rear end of the guide rail 8, the opening of the door is detected by a door-actuated switch (not shown) and the motor 37 operates in response to this detection signal to rotate the gear 41 in the direction of arrow "A" in FIG. 4 via gear 39 and idle gear 40. The protrusions 41b and 41c on the gear 41 engage the protrusions 30c and 30d on the second drum 30, after they rotate through the prior lost-motion resulting from the winding of the drive tape and driving band onto the drum 28. After the contact, the driving band 27 and the drive tape 26 are unwound from the first drum 28, and the driving band 27 is wound onto the second drum 30. The driving band applies a pulling force to rotate the first drum 28 and push the drive tape 26 along its constrained path, thereby keeping the wraps of tape and band on the drum 28 from loosening. Meanwhile, the first drum 28 relatively rapidly reduces in diameter by the unwinding of the tape 26 and band 27 while the second drum 30 relatively gradually increases in diameter through the winding of the band 27. However, since the second drum is turned at a constant rate by the function of the interlocking mechanism 31, the first drum 28 tends to turn slightly faster than the gear 39. However, the difference between the rotational speeds of the first drum 28 and the gear 39 is absorbed by the spring 37, so the flexible tape 26 does not slacken and the driving band 27 securely pushes out the flexible tape 26 in the longitudinal direction; in particular, the first drum 28 is rotatable relative to the gear 39 within the range of a certain angle, and is also biased by the spring 37 in the direction of winding of the tape and band relative to the gear 39.

Figure 3:
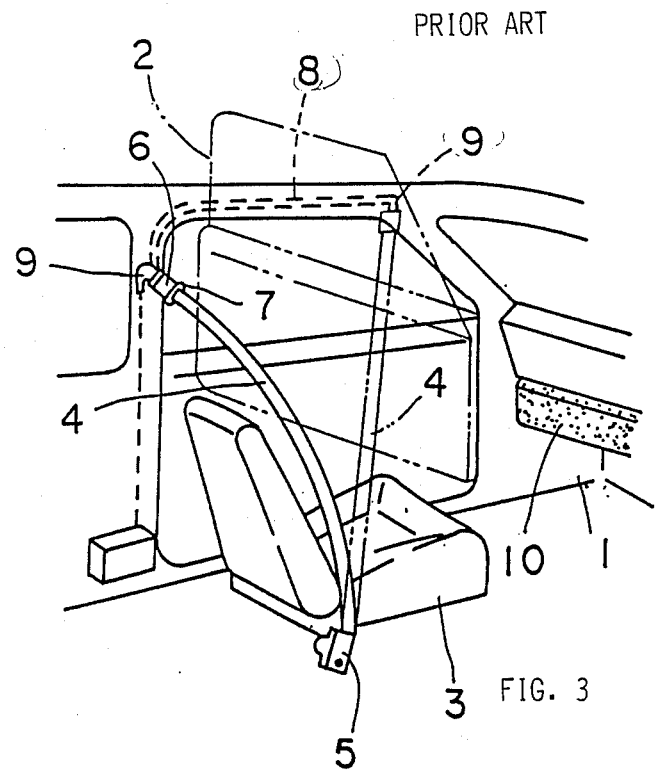
FIG. 3 is a pictorial view of a passive safety belt system exemplary of those in which the present invention can be used.

As a result, the drive tape 26 moves in the direction of the arrow "B" in FIG. 4, guided by the guide member 43, and the belt guide 9 attached to the end of the tape 26 moves along the guide rail 8 to the passenger releasing position shown by double-dotted lines in FIG. 3. The guide member 43 ensures that the drive tape 26 does not buckle and become damaged when it is pushed out.

When an occupant is seated on the seat 3 and closes the door 2, the action of the door-actuated switch causes the motor 37 to operate in the reverse direction and turn the gear 39 fixed to the drive shaft 36a in the direction of the arrow "D" in FIG. 4, and the first drum 28 starts to turn at the point where the protrusion 28d formed on the first drum 28 is contacted by the protrusion (not shown) provided at the back face of the gear 39. Before the first drum 28 starts rotating, the rotation of the gear 39 only tensions the spring 37 and does not start the rotation of the first drum 28; the time when the gear 39 starts to turn is prior to the time when the first drum 28 starts to turn.

On the other hand, the rotation of the gear 39 is transmitted to the gear 41 via the idle gear 40, and the gear 41 begins turning simultaneously with the gear 39. Then, as the gear 41 turns in the reverse direction to the above-mentioned case, i.e., in a direction unwinding the band 27, the protrusions 41b and 41c on the gear 41 will rotate in a direction such that they disengage the protrusions 30c and 30d formed on the second drum 30. Further, the second drum 30 starts turning in the same direction as said gear 41 through the rewinding of the band 27 and the drive tape 26 onto the first drum 28.

This action is effective in that the protrusions 41b and 41c on the gear 41 do not contact the protrusions 30c and 30d on the second drum 30. This non-contacting condition among protrusions 41b, 41c, 30c and 30d is maintained throughout the winding of the tape 26 and the band 27 onto the first drum. When the tape and band are later unwound from the first drum to move the belt to the release position; the lost motion is recovered, and the band is wound onto the second drum without any risk of slackening. This solves the previously unsolved problem that the band 27 slackens and produces a play because the volume of the wraps of tape and band wound by the first drum 28 is larger than the volume of the wraps of band rewound from the second drum 30.

The drive tape 26 is ultimately wound onto the first drum 28, together with the winding band 27, to an extent sufficient to move the belt guide 9 attached to the end of the tape 26 along the guide rail 8 to the passenger restraining position, where the guide is locked to the guide rail by a suitable locking mechanism.

The present invention is not limited to the above-shown or mentioned embodiments, but can be modified into various forms without departing from the spirit of the invention. For example, the lost motion coupling is provided by protrusions in the above embodiment, but the lost motion coupling may also be a clutch interposed between the gear 41 and the second drum in place of the protrusions, by which the same results can be obtained as in the embodiment. Also, the gear train drive coupling can be replaced by timing belts and pulleys or spockets and a chain, as mentioned.

According to the present invention, the winding band is not subject to any play owing to loose winding because the second drum can freely rotate when the band is unwound from the second drum. This invention can, therefore, provide an automatic belt driving system which can prevent damage to the driving band through buckling, lengthen its service life and remarkably improve the reliability of the device.

I claim:

1. A drive device for a vehicle passive safety belt system in which the belt is wound automatically between a restraining configuration and a releasing configuration in response to opening and closing of the vehicle door, comprising a first rotatable drum, a flexible drive tape having one end affixed to the first drum and leading from the first drum along a constrained path to a belt guide that is movable along a guide rail in the vehicle, a second rotatable drum positioned adjacent the path of the drive tape and proximate to the first drum, a flexible driving band having one end affixed to the first drum and its other end affixed to the second drum, the driving band overlapping the drive tape and being arranged to wind onto the second drum while unwinding from the first drum conjointly with the drive tape and to keep the drive tape from slackening on the first drum upon unwinding, drive means for conjointly rotating the first and second drums selectively in one direction to wind the driving band onto the second drum and unwind the drive tape and the driving band from the first drum and in the opposite direction to wind the drive tape and driving band onto the first drum and unwind the driving band from the second drum, a spring coupled between the first drum and the drive means and biasing the first drum in said opposite direction relative to the drive means and yieldable to enable the first drum to rotate at a speed different from the drive means, and a lost motion coupling between the second drum and the drive means and adapted to couple the drive means to the first drum upon rotation in said one direction and to permit free rotation of the second drum within a predetermined range relative to the drive means upon rotation in said opposite direction.

2. A drive device according to claim 1 wherein the drive means includes a circular output member rotatable about an axis coincident with the axis of rotation of the second drum and wherein the lost motion coupling includes an abutment on the second drum and an abutment on the output member selectively engageable with the abutment on the second drum.

* * * * *